US009182887B2

(12) United States Patent  
Yu et al.

(10) Patent No.: US 9,182,887 B2  
(45) Date of Patent: Nov. 10, 2015

(54) USER INTERFACE APPARATUS FOR PATH SEARCH AND METHOD THEREOF

(71) Applicant: THINKWARE SYSTEMS CORPORATION, Gyeonggi-do (KR)

(72) Inventors: Hyun Joong Yu, Seoul (KR); Won Jun Heo, Seoul (KR); Jun Sik Kim, Incheon (KR)

(73) Assignee: Thinkware Systems Corporation, Gyeonggi-do (KR)

( * ) Notice: Subject to any disclaimer, the term of this patent is extended or adjusted under 35 U.S.C. 154(b) by 236 days.

(21) Appl. No.: 14/026,729

(22) Filed: Sep. 13, 2013

(65) Prior Publication Data

US 2014/0082561 A1    Mar. 20, 2014

(30) Foreign Application Priority Data

Sep. 14, 2012 (KR) ......................... 10-2012-0102225

(51) Int. Cl.
*G06F 3/0481* (2013.01)
*G06F 3/0482* (2013.01)
*G06F 3/0488* (2013.01)
*G01C 21/36* (2006.01)

(52) U.S. Cl.
CPC .......... *G06F 3/0482* (2013.01); *G01C 21/3617* (2013.01); *G01C 21/3664* (2013.01); *G06F 3/0488* (2013.01)

(58) Field of Classification Search
CPC .................................................. G06G 3/0481
USPC ......................................................... 715/835
See application file for complete search history.

(56) References Cited

U.S. PATENT DOCUMENTS

| | | | |
|---|---|---|---|
| 5,958,012 A * | 9/1999 | Battat et al. ................... 709/224 |
| 7,174,243 B1 * | 2/2007 | Lightner et al. ............. 701/32.4 |
| 8,201,096 B2 * | 6/2012 | Robert et al. ................. 715/767 |
| 8,762,059 B1 * | 6/2014 | Balogh .......................... 701/533 |
| 8,880,336 B2 * | 11/2014 | van Os et al. .................. 701/412 |
| 2006/0069503 A1 * | 3/2006 | Suomela et al. ............... 701/211 |
| 2006/0142942 A1 * | 6/2006 | Pyo ................................ 701/211 |
| 2008/0033919 A1 * | 2/2008 | Arrouye et al. ................... 707/3 |
| 2010/0189312 A1 * | 7/2010 | Nielsen et al. ................ 382/113 |
| 2011/0040657 A1 * | 2/2011 | Roswell ....................... 705/27.1 |
| 2011/0106433 A1 * | 5/2011 | Otani ............................ 701/202 |
| 2011/0191344 A1 * | 8/2011 | Jin et al. ........................ 707/739 |
| 2012/0253655 A1 * | 10/2012 | Yamada et al. ............... 701/409 |
| 2012/0254804 A1 * | 10/2012 | Sheha et al. .................. 715/834 |
| 2013/0304732 A1 * | 11/2013 | Tateno .......................... 707/736 |
| 2013/0345975 A1 * | 12/2013 | Vulcano et al. ............... 701/533 |
| 2013/0345981 A1 * | 12/2013 | van Os et al. ................. 701/540 |
| 2014/0005921 A1 * | 1/2014 | Voronel et al. ................ 701/423 |
| 2014/0201004 A1 * | 7/2014 | Parundekar et al. ....... 705/14.62 |
| 2015/0024783 A1 * | 1/2015 | Konno et al. .............. 455/456.3 |
| 2015/0039415 A1 * | 2/2015 | Boldyrev et al. .......... 705/14.41 |
| 2015/0040031 A1 * | 2/2015 | Lee et al. ...................... 715/748 |
| 2015/0074544 A1 * | 3/2015 | Tateno .......................... 715/745 |

OTHER PUBLICATIONS

Apple, User guide of iOs 4.2, released on Mar. 2011, 274 pages.*

* cited by examiner

*Primary Examiner* — Reza Nabi
(74) *Attorney, Agent, or Firm* — Saliwanchik, Lloyd & Eisenschenk

(57) ABSTRACT

A user interface apparatus for path search and a method thereof are disclosed. The interface apparatus for path search includes an interface unit configured to provide a first user interface comprising a plurality of image objects, the first user interface configured to implement sweeping transition between the image objects in at least one direction, wherein the interface unit displays an image associated with at least one place which is an object for path search on the image objects.

21 Claims, 12 Drawing Sheets

<When the number of recent destinations is '0'>

<When the number of recent destinations is '2'>

1/2

<When the number of recent destinations is '3'>

1/3

<When the number of recent destinations is '4'>

1/4

<When the number of recent destinations is '5'>

1/5

<When the number of recent destinations is 'M (M>5)'>

<When the number of recent destinations is '6'>

⋮

<When the number of recent destinations is '30'>

USER INTERFACE APPARATUS FOR PATH SEARCH AND METHOD THEREOF

CROSS REFERENCE TO RELATED APPLICATION

This application claims the benefit of Korean Patent Application No. 10-2012-0102225, filed Sep. 14, 2012, which is hereby incorporated by reference in its entirety.

BACKGROUND OF THE DISCLOSURE

1. Field of the Invention

Exemplary embodiments of the disclosure relate to a user interface apparatus for path search which can search for a path to a place a user desires to search for easily and quickly, and a method thereof.

2. Discussion of the Background

Generally, a navigation system may guide searching a path for a vehicle (e.g., a car) via a map guide.

Such a conventional navigation system may usually provide a search menu when a user desires to set a destination for setting a path and a method for searching a path may include address searching, telephone searching and name searching. The address searching uses an address corresponding to the destination in searching a path to the destination and the telephone searching uses a telephone number of the destination in searching for a path to the destination. The name searching uses a general name corresponding to the destination in searching a path to the destination.

Korean Patent Publication No. 10-2009-0073663 (published on Jul. 3, 2011) discloses the technique that provides a search menu having a preset prior condition frequently used by a user to search a destination easily.

The present disclosure provides a technique for quickly searching a desired place a user desires to search when entering a menu mainly configured of searching menus.

The above information disclosed in this Background section is only for enhancement of understanding of the background of the disclosed subject matter and therefore may contain information that does not form any part of the prior art nor what the prior art may suggest to a person of ordinary skill in the art.

BRIEF SUMMARY

Exemplary embodiments of the present disclosure provide a user interface apparatus for path search which can search for a path to a place a user desires to search for easily and quickly, when entering a menu mainly configured of searching menus, and a method thereof.

Exemplary embodiments of the present disclosure also provide a user interface apparatus for path search which can provide the information the user desires to search for via a search screen.

Exemplary embodiments of the present disclosure also provide a user interface apparatus for path search which can provide a user interface having a slime depth.

Additional features of the present disclosure will be set forth in the description which follows, and in part will be apparent from the description, or may be learned by practice of the disclosed subject matter.

Exemplary embodiments of the present disclosure disclose an interface apparatus for path search including an interface unit configured to provide a first user interface comprising a plurality of image objects, the first user interface configured to implement sweeping transition between the image objects in at least one direction, wherein the interface unit displays an image associated with at least one place which is an object for path search on the image objects.

The place may be a recent destination.

A fixed number of image objects may be spread on the first user interface.

The interface unit may assign a defined to the image object to the place and display an image of the place on the assigned priority image object.

A unit number of the image objects are sweeping in at least one of up, down, left and right directions based on an event input by the user on the first user interface.

The image associated with the place may include at least one of summary information configured of a map image of the place, an icon for showing attributes of the place and information on the time when the place is set as a destination.

The interface unit may distinguishably display colors of the images in accordance with attributes of the place.

The interface unit may include a second user interface configured to display at least one of specific information configured of an address or a name of the place displayed on one of the image objects.

A fixed number of image objects are spreadly displayed on the first user interface, and specific information of a place displayed on an image object arranged in the center of the image objects.

The second user interface may provide a delete function for deleting a predetermined one of places displayed on the first user interface.

The second user interface may provide at least one of a search function for searching for a path to the place, a register function for setting the place as a registered place associated with the user and a transmit function for transmitting specific information of the place to another media.

The interface apparatus for path search may further include a setting unit configured to set to lock the first user interface.

The interface apparatus for path search may further include a setting unit configured to set to lock the second user interface.

The setting unit may set to lock entire places or to lock an individual place or attributes of a place when the specific information is displayed on the second user interface.

In another aspect, exemplary embodiments of the discloser also provide an interface method for path search including providing a first user interface comprising a plurality of image objects, the first user interface configured to implement sweeping transition between the image objects in at least one direction, wherein the providing the first user interface displays an image associated with at least one place which is an object for path search on the image objects.

According to the exemplary embodiments of the disclosure, the main screen mainly for search may be provided and the information for the user may be provided timely. Accordingly, when entering the menu, the user can search for a desired place more easily and quickly.

Furthermore, considering characteristics of the latest terminal (e.g., a smart phone and a smart navigation), a user interface having a slimmer depth structure may be provided and accessibility to a path search interface may be enhanced.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION

Figure 1:
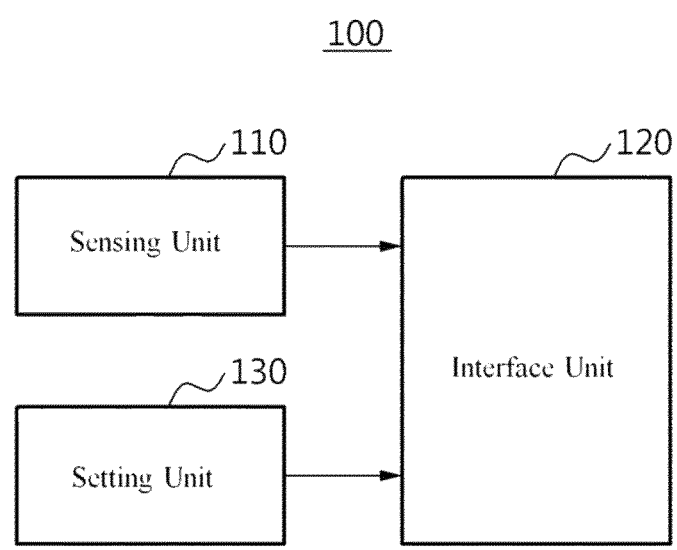
FIG. 1 is a block diagram illustrating an inner structure of a user interface apparatus for path search which provides a user interface for path search according to exemplary embodiments of the disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the disclosed subject matter will be described in detail with reference to the accompanying drawings.

Exemplary embodiments of the disclosure relate to a path search interface apparatus which provides a main screen mainly for search to allow a user to search for a place registered on a navigation system.

The path search interface apparatus exemplary embodiments of the disclosure may be applied to conventional navigation systems and examples of such conventional navigation systems include CNS (Car Navigation system) and PNS (Personal Navigation System), or realized by an application only for a mobile terminal and examples of a mobile terminal include a smart phone and a tablet.

The user interface apparatus for path search according to exemplary embodiments of the disclosure may be based on a gestural interface which recognizes user's movement to operate a navigation system.

FIG. 1 is a block diagram illustrating an inner structure of a user interface apparatus for path search 100 which provides a user interface for path search according to exemplary embodiments of the disclosure.

The user interface for path search shown in FIG. 1 includes a sensing unit 110, an interface unit 120 and a setting unit 130.

The sensing unit 110 may sense an event input in accordance with user movement based on touch or motion. For example, a terminal to which the user interface apparatus for path search 100 is applied includes a touchscreen and then a touch point and continuous touch gestures, which are carried out by the user, may be sensed as input evens for a navigation system. Alternatively, when the terminal to which the user interface for path search 100 is applied includes one or more means capable of sensing motion (e.g., a camera, a motion sensor, an infrared sensor and an image sensor), a specification performance of user motion may be sensed as an input even for the navigation system.

The interface unit 120 may implement a user interface for path searching. In exemplary embodiments, a main screen of the user interface may be set as menu environments mainly for search.

Figure 2:
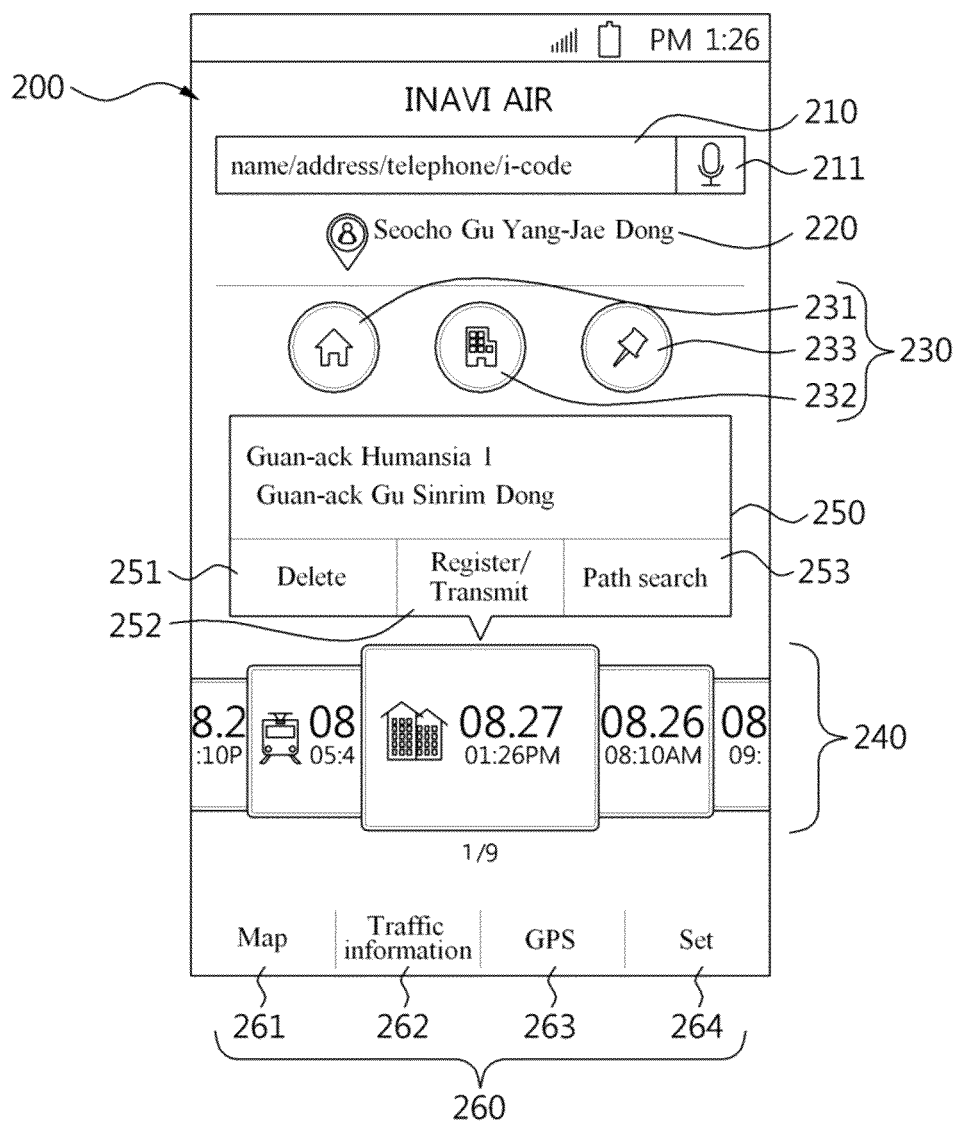
FIG. 2 is a diagram schematically illustrating a main screen according to exemplary embodiments of the disclosure.

Referring to FIG. 2, the configuration of the main screen 200 provided in the user interface for path searching will be described in detail.

The interface unit 120 may provide a search input box 210 for name search, address search, telephone number search and i-code search as a menu used by the user to search for a place by inputting a keyword directly. A button 211 for searching for a voice may be activated and displayed on the search input box 210 as a menu for searching for a place in accordance with input of the user's voice speaking a keyword.

The interface unit 120 may provide present location information 220 on the main screen 200. The interface unit 120 may display information on a current location of a user terminal or information received via GPS as a name of a current place and notify the user whether the system is displaying the current location correctly.

The interface unit 120 may also provide a basic search menu 230 on the main screen 200. the basic search menu 230 may include a 'home' search menu 231 for searching for a path to a place set as 'home', a 'frequently going place' search menu 232 for searching for a path to a frequently going place set as frequently going places and a 'registered place' search menu 233 for moving to a registered place list.

The interface unit 120 may also provide a side menu 260 on the main screen 200. The side menu 260 may include a 'map' menu 261 for providing a map screen of a current location, a 'traffic information' menu 262 for providing a tiled map of traffic information based on the current location, a 'GPS' menu 263 for providing GPS mode configured to support HUD (Head Up Display), a 'setting' menu 264 for providing integrated setting environments associated with the navigation system.

In this embodiment, the interface unit 120 may provide a first user interface 240 which consists of a plurality of image objects to carry out sweeping conversion in at least one direction between the image objects. An image associated with at least one place which is an object for path search (hereinafter, 'an assorted image') may be displayed on the first user interface 240.

The object for path search may mean the places preset in the navigation system (e.g., a registered place list and a recent destination list). Hereinafter, 'recent destinations' will be described as a representative example of the object. 'recent destinations' mean destinations the user recently visited and a predetermined number of places based on recently visiting time periods may be registered as 'recent destinations'. For example, up to 30 recent destinations may be stored and the oldest destination is deleted from more than 30 recent destinations, such that 30 recent destinations may be maintained.

Specifically, the interface unit 120 may provide the maximum number of recent destinations (e.g., 30 recent destinations) as thumbnail images via the first user interface 240 (hereinafter, 'recent destination search UI'). Summary information on at least one of a map image of a recent destination, an icon showing specifications of the corresponding place and information on the time set when a place is set as recent destination may be displayed on sorted images of recent destinations displayed on the recent destination search UI 240.

The recent destination search UI 240 may include a fixed number of image objects and it may display recent destinations, while image objects are sweeping in at least one of upward, downward, rightward and leftward directions in accordance with an event input by the user.

The interface 120 may provide a second user interface 250 (hereinafter, 'specific information view UI') configured to display specific information on a central one of the recent destinations displayed on the recent destination search UI 240. On the specific information view UI 250 may be displayed specific information on the corresponding destination and the specific information includes an address, a name, a telephone number, i-code and a number of parking-available cars of a place corresponding to the destination positioned in the center. Also, on the specific information view UI 250 may be provided a delete function 251 for deleting the corresponding place having the specific information displayed thereon from the recent destination list, a registering/transmitting function 252 for setting the corresponding place as a registered place associated with the user or transmitting the specific information on the corresponding to another media, and a search function 253 for searching for a path to the corresponding place as a destination. The registering/transmitting function 252 for the recent destinations may enable the user to register a shortcut to the corresponding place and transmit specific information on a place the user desires to view to a message, a mail, a web hard, a messenger, SNS to share the corresponding place with others via various medium.

Figure 3:
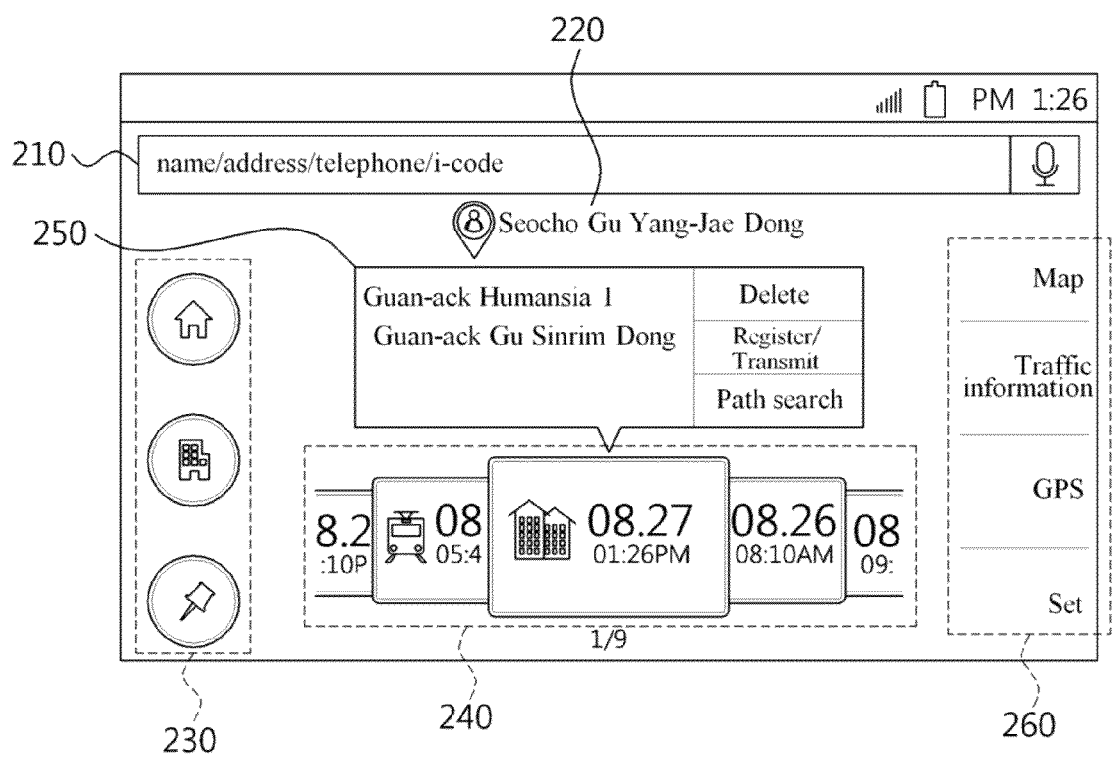
FIG. 3 is a diagram illustrating a horizontal mode screen according to exemplary embodiments of the disclosure.

The interface unit 120 may display a path search main screen 200 along a direction of a screen provided in the terminal (e.g., a vertical mode screen shown in FIG. 2 or a horizontal mode screen shown in FIG. 3). Specifically, the interface unit 120 may sense rotation of the terminal and change arrangement of the search input box 210, the current location information 220, the basic search menu 230, a recent destination search UI 240, the specific information view UI 250 and the side menu 260 in accordance with a direction of the screen provided in the terminal, only to automatically switch a mode of the path search main screen 200.

Referring to FIGS. 4, 5, 6, 7, 8, 9 and 10, the arrangement of the recent destination search UI 240 and a principle of sweeping will be described in detail.

Figure 4:
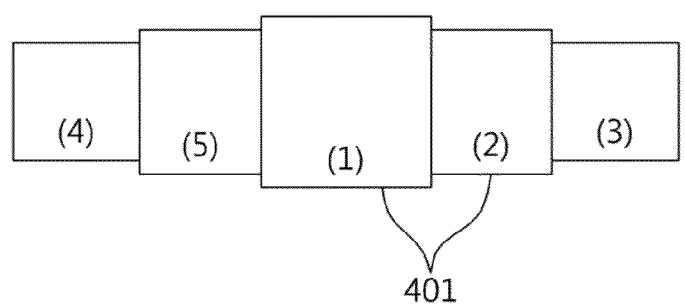
FIG. 4 is a diagram illustrating an example of US for searching for recent destinations exemplary embodiments of the disclosure.

For example, 5 image objects 401 may be basically displayed on the recent destination search UI 240 as shown in FIG. 4, unfolded in a horizontal direction. A central one of the five image objects is the largest and the other ones are getting smaller in accordance with a distance to the central object with respect to the central one symmetrically.

Alternatively, image objects 401 displayed on the recent destination search UI 240 may be asymmetrical with respect to a central one. The image objects are getting larger or smaller from the leftmost one toward the rightmost one.

When displaying sorted images of the recent destination on an image object, the recent destination search UI 240 may display a different color for each of the sorted images based on specifications of the place corresponding to the recent destination. For example, the recent destination search UI 240 may provide a different color to each of sorted images in accordance with a categorization system for categorizing POI on a map (e.g., a gas station, a public place, a school and a hospital). Alternatively, the recent destination search UI 240 may provide a different color to the places set by the user (e.g., frequently visiting places and registered places) from a color of the other places, or provide a different color to each of sorted images in accordance with types of places out of the places set by the user (e.g., home, frequently visiting places and registered places). Different colors may be preset for the sorted images based on specifications of places, respectively, or different colors may be directly set or changed by the user.

Especially, the ranking may be defined for image objects 401 as a standard for displaying sorted images corresponding to the recent destination. As shown in parenthesis of FIG. 4, an image object positioned in a central area is the first priority and right image objects from the central image object are the second priority and the third priority. The image objects from the leftmost one may be defined as the fourth priority and the fifth priority. The priority defined for the image objects may be changeable.

The recent destination search UI 240 may also provide a number of recent destinations positioned adjacent to the central one and it may provide information (n/m) on which the recent destination displayed on the central image object is the nth one (n) from the entire places (m) based on the recent visiting time. When there is not recent destination, '_' may be displayed.

In exemplary embodiments of the disclosure, the arrangement of the sorted images and the sweeping principle of the recent destination search UI 240 may be determined in accordance with the number of the recent destinations.

When the number of the recent destinations is zero, 5 default images may be provided in the recent destination search UI 240. In case there is no recent destination, words of guidance (e.g., 'no recent destination') may be provided on the specific information view UI 250.

Figure 5:
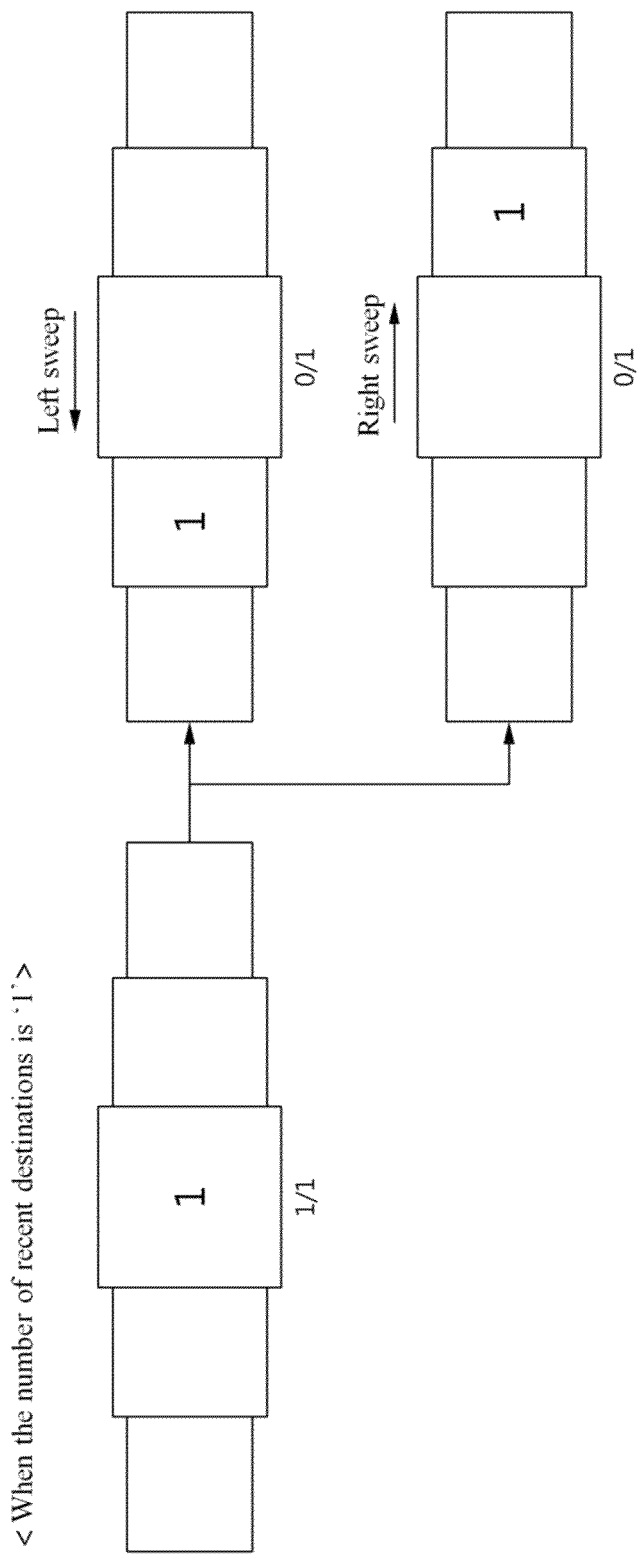
FIGS. 5, 6, 7, 8, 9 and 10 are diagrams illustrating arrangement and sweeping in accordance with the number of the recent destinations.

When the number of the recent destinations is 1, one recent destination is designated as the first priority as shown in FIG. 5. Sorted images of the recent destination may be displayed on a central one corresponding to the first priority out of 5 image objects and default images may be displayed on the other image objects.

When a sweeping gesture in a left direction is input by the user as shown FIG. 5, sweeping is carried out to move the object, in which sorted images are displayed, one by one in a left direction. When a sweeping gesture in a right direction is input, the object having the sorted images displayed therein one by one in a right direction.

Figure 6:
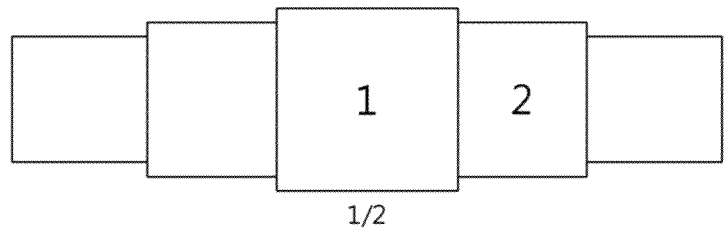
Figure 6:
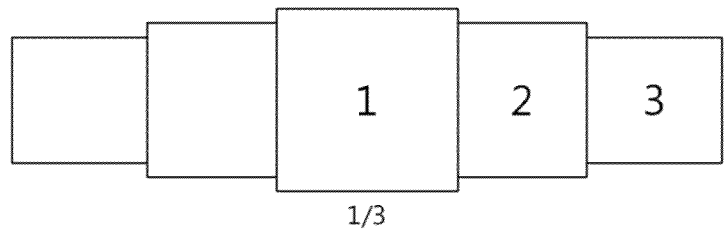
Figure 6:
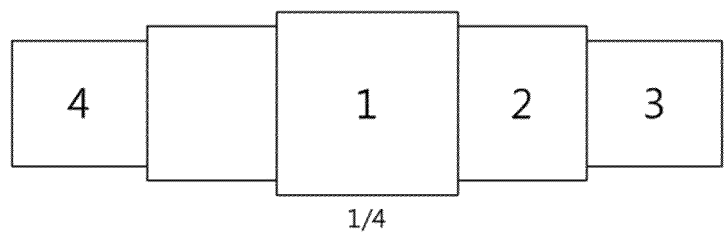
Figure 6:
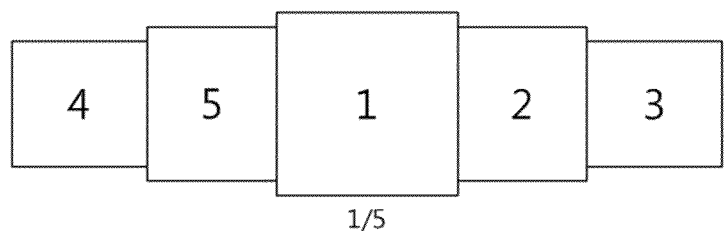

FIG. 6 illustrates a principle of sorted image arrangement when there are 2~5 recent destinations.

When the number of the recent destinations is 2, an image object of the first priority is assigned to the most recent destination and an image object of the second priority is assigned to the other recent destination. Sorted images of the place corresponding to the image object of each priority may be displayed.

When the number of the recent destinations is 3, image objects of the first priority, the second priority and the third priority may be sequentially assigned to the most recent destinations with respect to the recently visiting times of the recent destinations and sorted images of the places may be displayed on the image objects of the assigned priorities, respectively.

When the number of the recent destinations is 4, image objects of the first priority, the second priority, the third priority and the fourth priority may be sequentially assigned to the most recent destinations with respect to the recently visiting times of the recent destinations and sorted images of the places may be displayed on the image objects of the assigned priorities, respectively.

When the recent destinations is less than the image objects, a default image may be displayed on the image object having no recent destination assigned thereto.

When the number of the recent destinations is 5, image objects of the first priority, the second priority, the third priority, the fourth priority and the fifth priority may be sequentially assigned to the most recent destinations with respect to the recently visiting times of the recent destinations and sorted images of the places may be displayed on the image objects of the assigned priorities, respectively.

As mentioned in FIGS. 5 and 6, the sorted images of the recent destinations corresponding to the priorities of the image objects may be assigned in accordance with the recently visiting times when there are less than 5 recent destinations.

Figure 7:
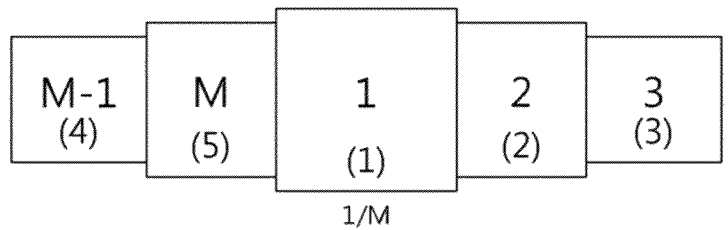

When the number (M) of the recent destinations is larger than the number of the image objects composing the recent destination search UI 240, sorted images may be arranged as shown in FIG. 7.

If the recent destination list consists of 1, 2, 3, 4, . . . , M−2, M−1 and M in order of the recently visiting time, the first place visited most recently may be assigned to a first priority image object and the second mostly visited destination may be assigned to a second priority image object. The third mostly visited destination may be assigned to a third priority image object and the M−1 mostly visited destination may be assigned to a fourth priority image object as shown in FIG. 7. The M mostly visited destination may be assigned to a fifth priority image object.

Figure 8:
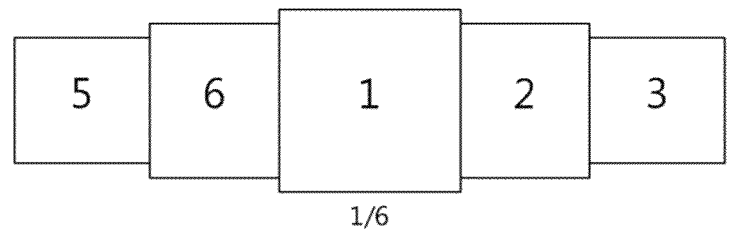
Figure 8:
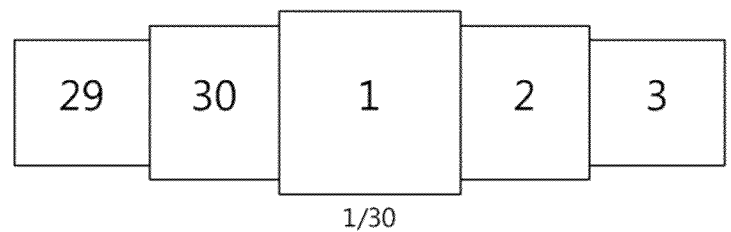

In other words, when the number of the recent destinations is 6 as shown in FIG. 8, the first, second, third, fifth and sixth places which are the first, second third, M−1 and M mostly visited places may be displayed on 5 image objects. When the number of the recent destinations is 30, the first, second third, twenty-ninth and thirty places which are the first, second, third, M−1 and M mostly visited destinations with respect to the recently visited time may be displayed on 5 image objects.

Figure 9:
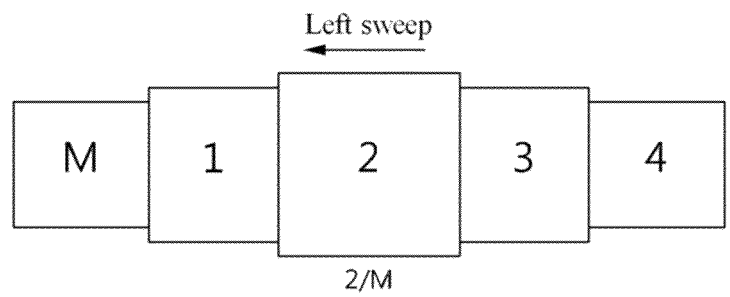
Figure 9:
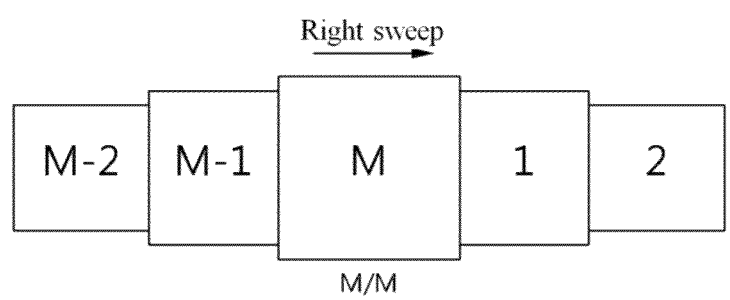

When the recent destinations are more than the image objects, a left direction sweeping gesture is input on an initial image (FIG. 7) by the user and sweeping configured to move a sorted image of the first mostly visited destination to the next point in a left direction may be implemented as shown in FIG. 9. At this time, the fourth mostly visited destination may be newly assigned to and displayed on the third priority image object. The sweeping for leftward motion may allow the user to carry out descending order search for sequentially searching for the destinations most recently stored out of the places stored as the recent destinations. In contrast, when a rightward sweeping gesture is input on an initial screen (FIG. 7) by the user, sweeping configured to move a sorted image of the first mostly visited destination to the next point in a right direction may be implemented. At this time, the M−2 most recently visited place may be newly assigned to and displayed on a fourth priority image object. The sweeping for rightward motion may allow the user to carry out ascending order search for sequentially searching for the destinations most lately stored out of the places stored as the recent destinations.

Figure 10:
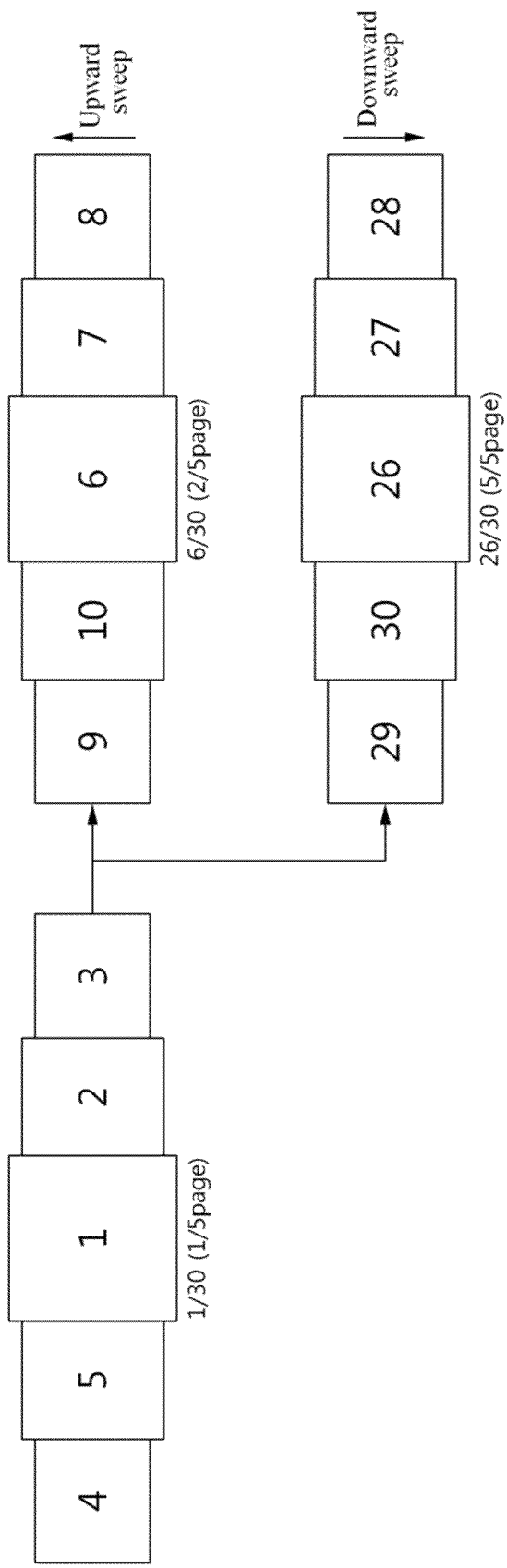

Alternatively, when the recent destinations are more than the image objects, each 5 sorted images of the recent destinations as unit number which is the number of the image objects may be displayed per one sweeping. As shown in FIG. 10, when the recent destinations are 30, sorted images corresponding to top 5 destinations most recently stored may be displayed on an initial screen of the recent destination search UI 240. When an upward sweeping gesture is input by the user, sorted images of the $6^{th}$~$10^{th}$ places may be displayed. When a downward sweeping gesture is input, sorted images of the $26^{th}$~$30^{th}$ places may be displayed. In leftward/rightward sweeping, each sorted image may be sweeping within 5 places currently displayed on the recent destination search UI 240. In upward/downward sweeping, each 5 sorted images may be sweeping within 30 places.

Figure 11:
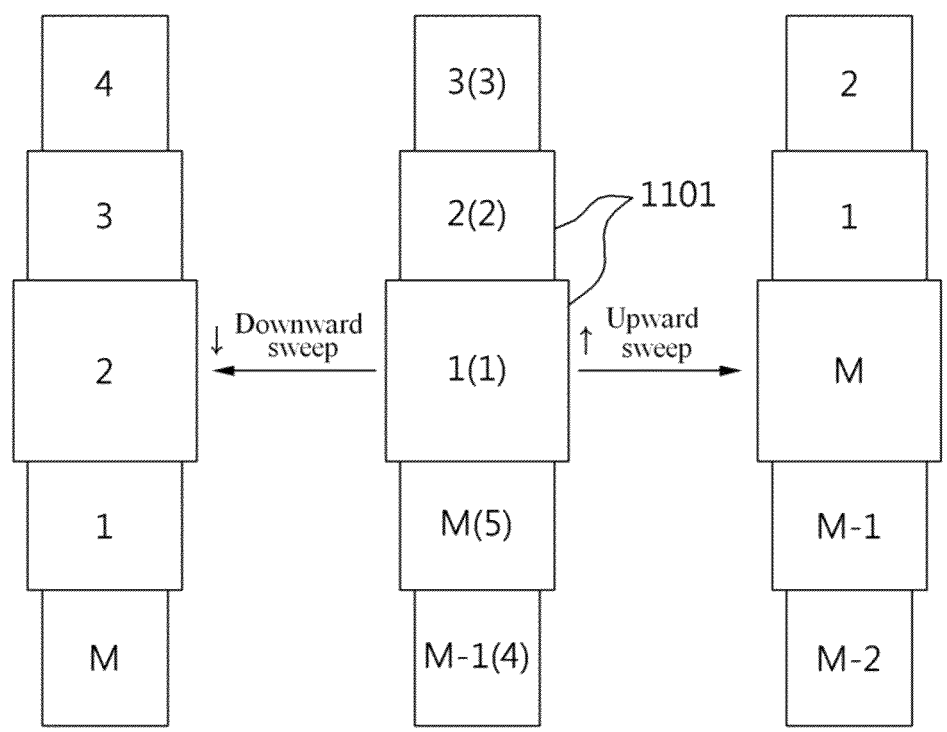
FIG. 11 is a diagram illustrating another example of US for recent destinations exemplary embodiments of the disclosure.

Alternatively, image objects 1101 may be spread in a vertical direction on the recent destination search UI 240 as shown in FIG. 11. The image objects shown in FIG. 11 may be symmetrically displayed with respect to a center image object as shown in FIG. 11 or asymmetrically displayed with respect to a center image object in accordance with a manner of realizing an UI.

If the recent destination list consists of 1, 2, 3, 4 ... M−2, M−1 and M places in order of the recently visiting time, the first most recently visited place may be assigned to a first priority image object provided in a central area and the second most recently visited place may be assigned to a second priority image object. The third mostly recently visited place may be assigned to a third priority image object and the M−1 most recently visited place may be assigned to a fourth priority image object and the M most recently visited place may be assigned to a fifth priority image object.

When a downward sweeping gesture is input by the user on an initial screen of the recent destination search UI 240, sweeping configured to move a sorted image of the first most recent destination to the next point in a downward direction may be implemented and the fourth most recent destination may be newly assigned to and displayed on a third priority image object. The sweeping conversion for downward motion may allow the user to carry out descending search for sequentially searching from the destination most recently stored out of the recently stored destinations. When an upward sweeping gesture is input by the user on the initial screen, sweeping configured to move a sorted image of the first most recent destination to the next point in an upward direction may be implemented. At this time, the M−2 most recent destination may be newly assigned to and displayed on a fourth priority image object. The sweeping conversion for upward motion may allow the user to carry out ascending search for sequentially searching from the oldest stored destination out of the places stored as the recent destinations.

When image objects of the recent destination search UI 240 are spread in a horizontal direction, the specific information view UI 250 configured to provide specific information of the place corresponding to the recent destination may be displayed beyond or below a central one. When image objects of the recent destination search UI 240 are spread in a vertical direction, the specific information view UI 250 may be displayed on the left or right of the central image object.

As mentioned above, the interface unit 120 may determine the principle of the arrangement and sweeping of the sorted images displayed on the recent destination search UI 240. The interface unit 120 may provide specific information of the corresponding place stored as the recent destination displayed on a central image object on the specific information view UI 250. In other words, the specific information view UI 250 provides specific information of the recent information displayed on the corresponding image object, in a state of being focused on a central item of the recent destination search UI 240, such that the user may directly select rightward/leftward sweep or thumbnail (sorted images) to search for a place on the recent destination list.

Referring back to FIG. 1, the setting unit 130 may carry out a function of setting environments associated with the navigation system. In this embodiment, the setting unit 130 may set lock for the recent destination search UI 240 and the specific information view UI 250 to protect personal information. The setting unit 130 may set a code for preventing the expression of the recent destination search UI 250, that is, the recent destination list. When a code is set for the recent destination search UI 240, a code for the specific information view UI 250 may be automatically set. In addition, the setting unit 130 may set a code for displaying specific information of entire places exposed on the recent destination search UI 240 or a code for each recent destination or each piece of specific information.

Figure 12:
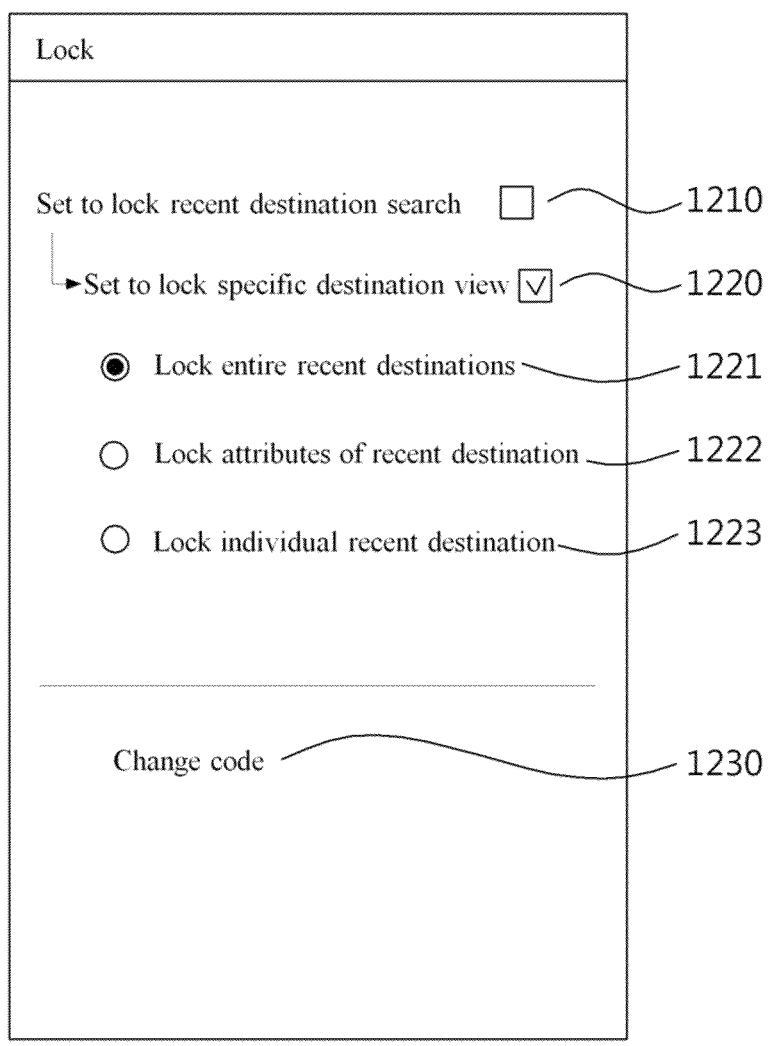
FIG. 12 is a diagram illustrating a code setting for recent destination search UI exemplary embodiments of the disclosure.

FIG. 12 is a diagram illustrating a screen for setting a code for the recent destination search UI.

For example, to a code setting screen may be provided a 'recent destination search lock setting' menu 1210 for setting to lock the recent destination search UI 240, a 'specific information view lock setting' menu 1220 for setting to lock the specific information view UI 250, and a 'code changing' menu 1230 for setting and changing the code used in locking/unlocking When the user selects 'recent destination search lock setting' menu 1210, the exposure of the recent destination search UI 240 may be limited. When the user selects 'specific information view lock setting' menu 1220, the exposure of the specific information view UI 250 displaying the specific information of the recent destinations may be limited.

When the recent destination search UI 240 is locked via 'recent destination search lock setting' menu 1210, the lock for the specific information view UI 250 may be automatically set and 'specific information view lock setting' menu 1220 may be displayed in a deactivated or hidden state.

As shown in FIG. 12, 'specific information view lock setting' menu 1220 may be displayed in an activated state, when the recent destination search UI 240 is unlocked. At this time, as submenus of 'specific information view lock setting' menu 1220 may be provided a 'entire lock' menu 1221 for setting to lock an entire area of the recent destinations, a 'attribute lock' menu 1222 for setting to lock an attribute area of the recent destinations and a 'individual lock' menu 1223 for setting to lock an individual area on the recent destination selectively.

When the user selects 'entire lock' menu 1221, the recent destination list may be displayed on the recent destination search UI 240 and specific information of each may be exposed after a code is input. When the user selects 'attribute lock' menu 1222, an entire attribute list of the place (e.g., a gas station, a public place, a school and a hospital) may be displayed and it selectively restricted to expose specific information of the attribute place selected by the user. When the user selects 'individual lock' menu 1223, a place list corresponding to the recent destinations may be displayed and it is selectively restricted to expose specific information of the individual place selected by the user.

Figure 13:
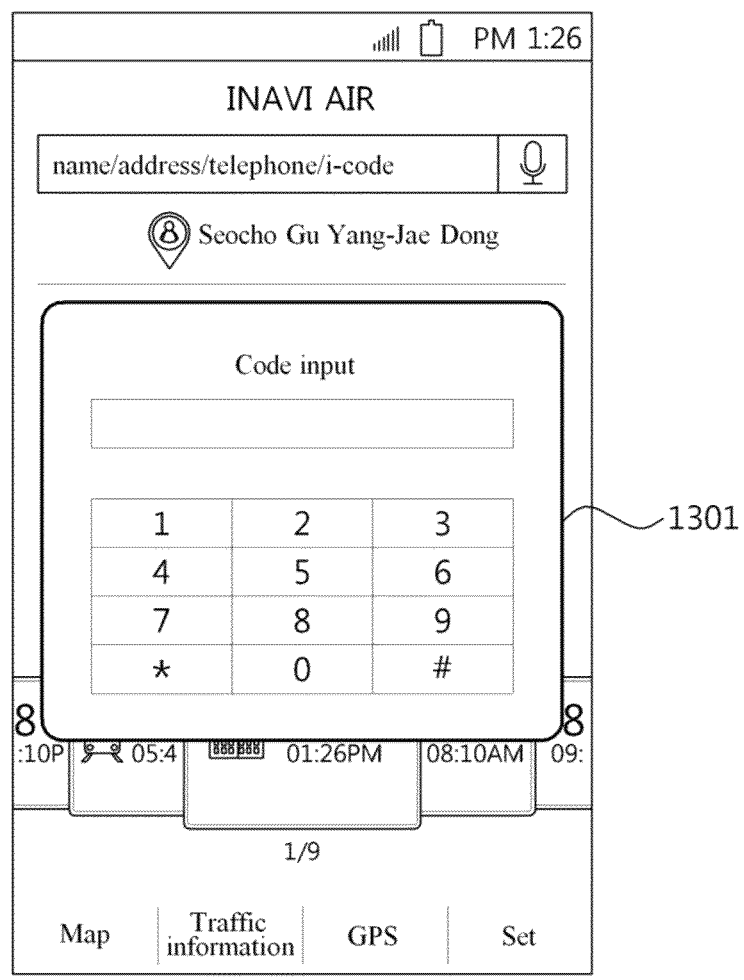
FIG. 13 is a diagram illustrating a popup for code input in the recent destination search UI exemplary embodiments of the disclosure.

As mentioned above, when the recent destination search UI 240 and the specific information view UI 250 are locked, the interface unit 130 shown in FIG. 13 requests the user to input a code via a popup window 1301 for exposing the recent destination search UI 240 and the specific information view UI 250. When the code input via the popup window 1301 is identical to a preregistered code, the corresponding information may be exposed.

According to the configuration mentioned above, the interface apparatus for path search 100 may configurate the main screen of the user interface with menus mainly for path search. Especially, a fixed number of thumbnails may be spread and displayed as the list of the places which are the path search objects. Accordingly, UI environments allowing the user to search a place the user desires to search for after entering a menu.

Figure 14:
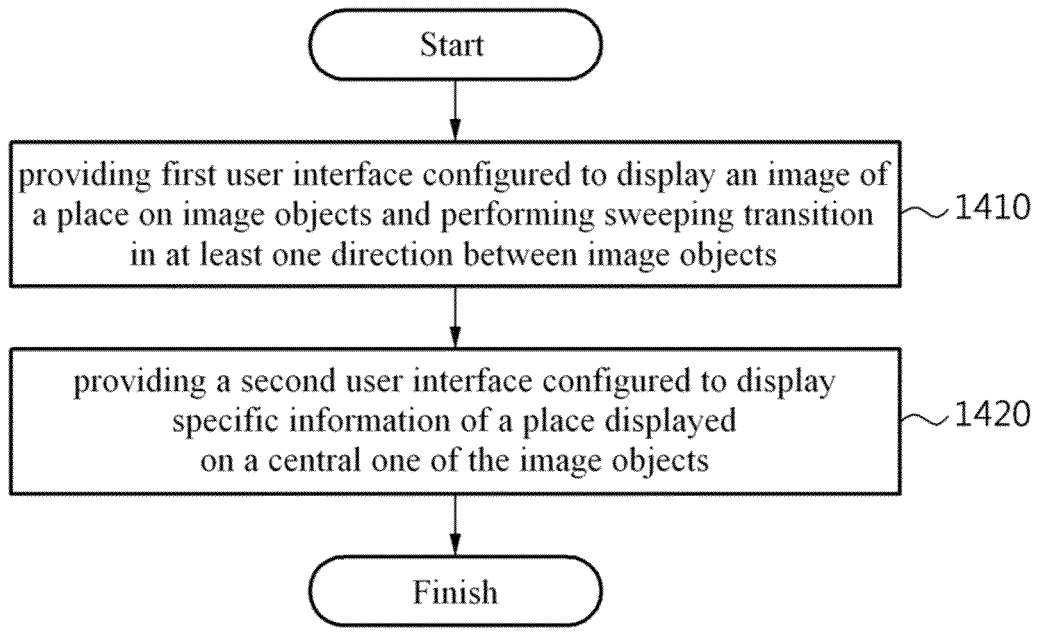
FIG. 14 is a flow chart illustrating a method of a path search interface which provides a user interface for path search exemplary embodiments of the disclosure.

FIG. 14 is a flow chart illustrating a method of a path search interface which provides a user interface for path search exemplary embodiments of the disclosure. Steps of the method of the path search interface according to exemplary embodiments may be performed by the interface apparatus for path search described, referring to FIGS. 1, 2, 3, 4, 5, 6, 7, 8, 9, 10, 11, 12 and 13.

In a step 1410, the interface apparatus may configurate a main screen for path search with menu environments mainly for searching and provide a user interface for path search. The interface apparatus for path search may basically provide a searching function enabling name search, address search, telephone search, code search and voice search and a search function for searching a path to home set by the user, a frequently visiting place, registered place. In this embodiment, the interface apparatus for path search may provide a recent destination search UI (a first user interface) configured to display a recent destination list as a plurality of image objects which is an object for path search. The recent destination UI may display sorted images (e.g., thumbnails) of the recent destination on the spread image objects, respectively. On the sorted image may be displayed at least one summary information of a map image of the recent destination and an icon showing an attributes of the corresponding place. Especially, the recent destination search UI may assign priorities defined for the image objects to the places of the recent destinations in accordance with the recently visited time and display sorted images of the place on the assigned priority image objects, respectively. Also, on the recent destination search UI may be a unit number of image objects may be sweeping in at least one of up, down, left and right direction in accordance with an event input by the user such that the user can search for the recent destinations, selecting a sweep gesture and/or thumbnail. Colors of sorted images may be distinguished from each other in accordance with attributes of places corresponding to the recent destinations when sorted images of the recent destinations are displayed on the recent destination search UI may display a color.

In a step (1420), the interface apparatus for path search may provide a specific information view UI (a second user interface) configured to display specific information on a place arranged in a central one of the image objects of the recent destinations displayed on the recent destination search UI. At this time, on the specific information view UI may be displayed specific information (e.g., an address, a name, a telephone number and i-code of the place and a number of cars which can be parked in the place). The specific information view UI may express specific information on a recent destination displayed on a corresponding image object focused on a central area of the recent destination search UI, such that the user can directly select sweep or thumbnail on the recent destination UI and search for a place on the recent destination list. The specific information view UI may provide a delete function for deleting a place having specific information displayed thereon from the recent destination list, a register/transmit function for setting a corresponding place as a registered place associated with the user or transmitting specific information of the corresponding place to another media, and a search function for immediately searching a path to the corresponding place as a destination.

In addition, the interface apparatus for path search may set to lock the recent destination search UI and the specific information view UI. At this time, the interface apparatus for path search may set to lock the recent destination search UI to restrict the exposure of the recent destination list. When the recent destination search UI is locked, the specific information view UI may be automatically set to be locked and the exposure of the specific information view UI may be also restricted. The interface apparatus for path search may set to lock entire places in displaying specific information of the recent destination, or lock an individual place or selectively lock attributes for places.

The interface method for path search may include abbreviate operations or additional operations based on the detailed specifications of the interface apparatus for path search described, referring to FIGS. 1, 2, 3, 4, 5, 6, 7, 8, 9, 10, 11, 12 and 13. More than two operations may be combined or the order or positions of the operations may be changed.

According to the exemplary embodiments of the disclosure, the main screen mainly for search may be provided and the information for the user may be provided timely. Accordingly, when entering the menu, the user can search for a desired place more easily and quickly. Furthermore, considering characteristics of the latest terminal (e.g., a smart phone and a smart navigation), a user interface having a slimmer depth structure may be provided and accessibility to a path search interface may be enhanced.

The methods according to the exemplary embodiments may be realized into program introductions which can be implemented in various computer systems and recorded in a computer readable media. Especially, the embodiments may include a computer readable media in which a program including a step of providing a first user interface enabling sweeping in at least one direction between image objects when the user interface for path search is provided is recorded. In the step of providing the first user interface, an image associated with at least one place which is the path search object may be displayed on the image object. At this time, the object for path search via the first user interface may mean a recent destination and at least one piece of summary information (e.g., a map image of a corresponding place, an icon displaying attributes of the place and information of the time when the place is set as a destination. The program according to the exemplary embodiments may further include a step of providing a second user interface displaying at least one piece of specific information (e.g., an address or name of the place displayed on one of image objects. At this time, the second user interface may provide at least one of a delete function for deleting the place from a recent destination list, a search function for searching for a path to the place, a register function for setting the place as a registered place associated with the user and a transmit function for transmitting specific information of the place to another media.

The program according to the exemplary embodiments may be a PC-based program or an application for a mobile terminal (e.g., a smart phone, a tablet and a navigation terminal). The computer readable medium may include a program command, a data file, a data structure or combination of them. The program introduction recorded in the medium may be configured for exemplary embodiments of the disclosure or well known to those skilled in computer software. The pile system mentioned above may be recorded in a computer readable media.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. An interface apparatus for path search comprising:
a processor;
an interface unit configured to provide a first user interface comprising a plurality of image objects, the first user interface configured to implement sweeping transition between the image objects in at least one direction,
wherein the interface unit displays an image associated with at least one place which is an object for path search on the image objects, wherein the interface unit comprises a second user interface configured to display at least one of specific information configured of an address or a name of the place displayed on one of the image objects, wherein the second user interface provides at least two of a search function for searching for a path to the place, a register function for setting the place as a registered place associated with the user and a transmit function for transmitting specific information of the place to another media.

2. The interface apparatus for path search of claim 1, wherein the place is a recent destination.

3. The interface apparatus for path search of claim 1, wherein a fixed number of image objects are spread on the first user interface.

4. The interface apparatus for path search of claim 1, wherein the interface unit assigns a defined to the image object to the place and displays an image of the place on the assigned priority image object.

5. The interface apparatus for path search of claim 1, wherein a unit number of the image objects are sweeping in at least one of up, down, left and right directions based on an event input by the user on the first user interface.

6. The interface apparatus for path search of claim 1, wherein the image associated with the place comprises at least one of summary information configured of a map image of the place, an icon for showing attributes of the place and information on the time when the place is set as a destination.

7. The interface apparatus for path search of claim 1, wherein the interface unit distinguishably displays colors of the images in accordance with attributes of the place.

8. The interface apparatus for path search of claim 1,
wherein a fixed number of image objects are spreadly displayed on the first user interface, and
specific information of a place displayed on an image object arranged in the center of the image objects.

9. The interface apparatus for path search of claim 1,
wherein the second user interface provides a delete function for deleting a predetermined one of places displayed on the first user interface.

10. The interface apparatus for path search of claim 1, further comprising:
a setting unit configured to set to lock the first user interface.

11. The interface apparatus for path search of claim 1, further comprising:
a setting unit configured to set to lock the second user interface.

12. The interface apparatus for path search of claim 11, wherein the setting unit sets to lock entire places or to lock an individual place or attributes of a place when the specific information is displayed on the second user interface.

13. An interface method for path search comprising:
providing a first user interface comprising a plurality of image objects, the first user interface configured to implement sweeping transition between the image objects in at least one direction,
wherein the providing the first user interface displays an image associated with at least one place which is an object for path search on the image objects,
wherein the interface unit comprises a second user interface configured to display at least one of specific information configured of an address or a name of the place displayed on one of the image objects,
wherein the second user interface provides at least two of a search function for searching for a path to the place, a register function for setting the place as a registered place associated with the user and a transmit function for transmitting specific information of the place to another media.

14. The method for path search of claim 13, wherein the place is a recent destination, and
the image associated with the place comprises at least one of summary information configured of a map image of the place, an icon for showing attributes of the place and information on the time when the place is set as a destination.

15. The method for path search of claim 13, wherein the providing the first user interface distinguishably displays colors of the images in accordance with attributes of the place.

16. The method for path search of claim 13, wherein the second user interface provides at least one of a delete function for deleting a predetermined one of places displayed on the first user interface, a search function for searching for a path to the place, a register function for setting the place as a registered place associated with the user and a transmit function for transmitting specific information of the place to another media.

17. The method for path search of claim 13, further comprising:
setting to lock the second user interface,
wherein the setting to lock the second user interface sets to lock entire places or to lock an individual place or attributes of a place when the specific information is displayed on the second user interface.

18. A non-transitory computer readable media comprising:
an instruction configured to control a computer system to provide a user interface for path search,
wherein the introduction controls the computer system in accordance with a method comprising providing a first user interface comprising a plurality of image objects, the first user interface configured to implement sweeping transition between the image objects in at least one direction, and
the providing the first user interface displays an image associated with at least one place which is an object for path search on the image objects,
wherein the interface unit comprises a second user interface configured to display at least one of specific information configured of an address or a name of the place displayed on one of the image objects,
wherein the second user interface provides at least two of a search function for searching for a path to the place, a register function for setting the place as a registered place associated with the user and a transmit function for transmitting specific information of the place to another media.

19. The computer readable media of claim 18, wherein the place is a recent destination, and
the image associated with the place comprises at least one of summary information configured of a map image of the place, an icon for showing attributes of the place and information on the time when the place is set as a destination.

20. The computer readable media of claim 18, wherein the second user interface provides at least one of a delete function for deleting a predetermined one of places displayed on the first user interface, a search function for searching for a path to the place, a register function for setting the place as a registered place associated with the user and a transmit function for transmitting specific information of the place to another media.

21. The computer readable media of claim 18,
wherein the introduction controls the computer system in accordance with a method further comprising setting to lock the second user interface, and
the setting to lock the second user interface sets to lock entire places or to lock an individual place or attributes of a place when the specific information is displayed on the second user interface.

\* \* \* \* \*